Aug. 7, 1934. W. C. HEDGCOCK ET AL 1,969,130
TRUCK
Filed Dec. 15, 1928  4 Sheets—Sheet 2
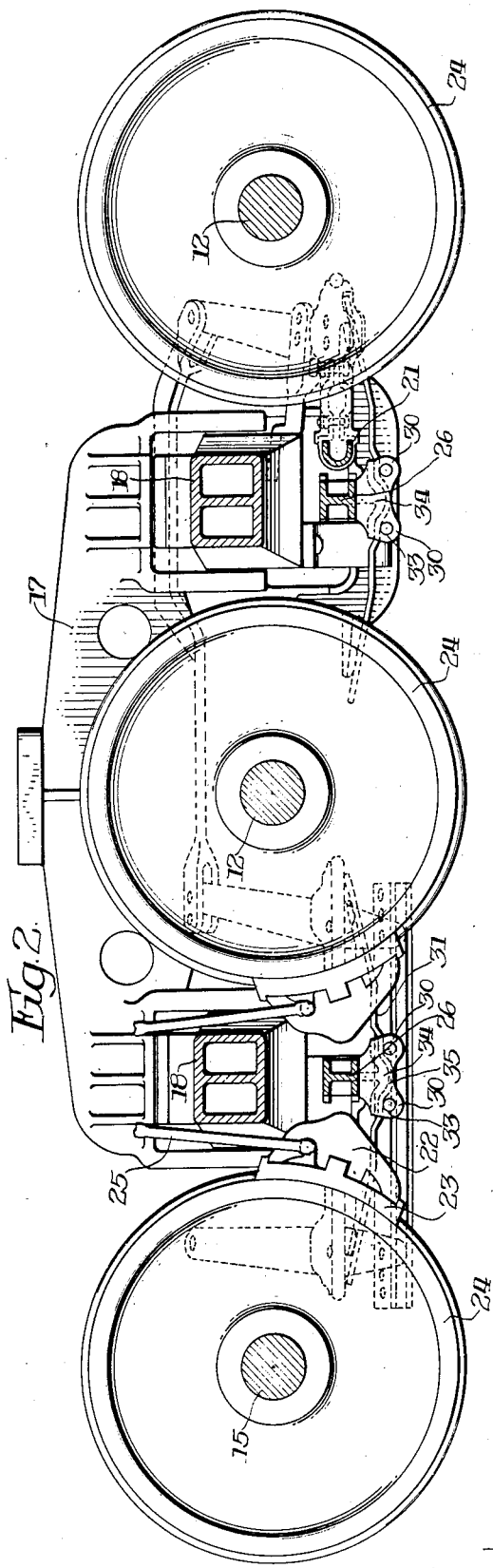
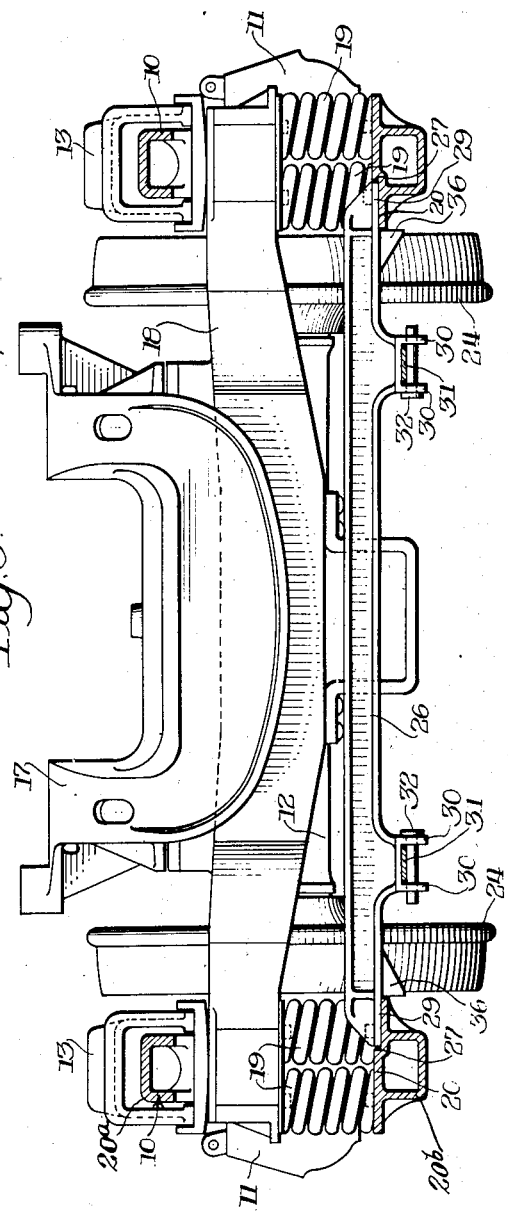
Inventors.
William C. Hedgcock
Edwin George Busse
By Wilkinson, Huxley, Byron & Knight
Attys

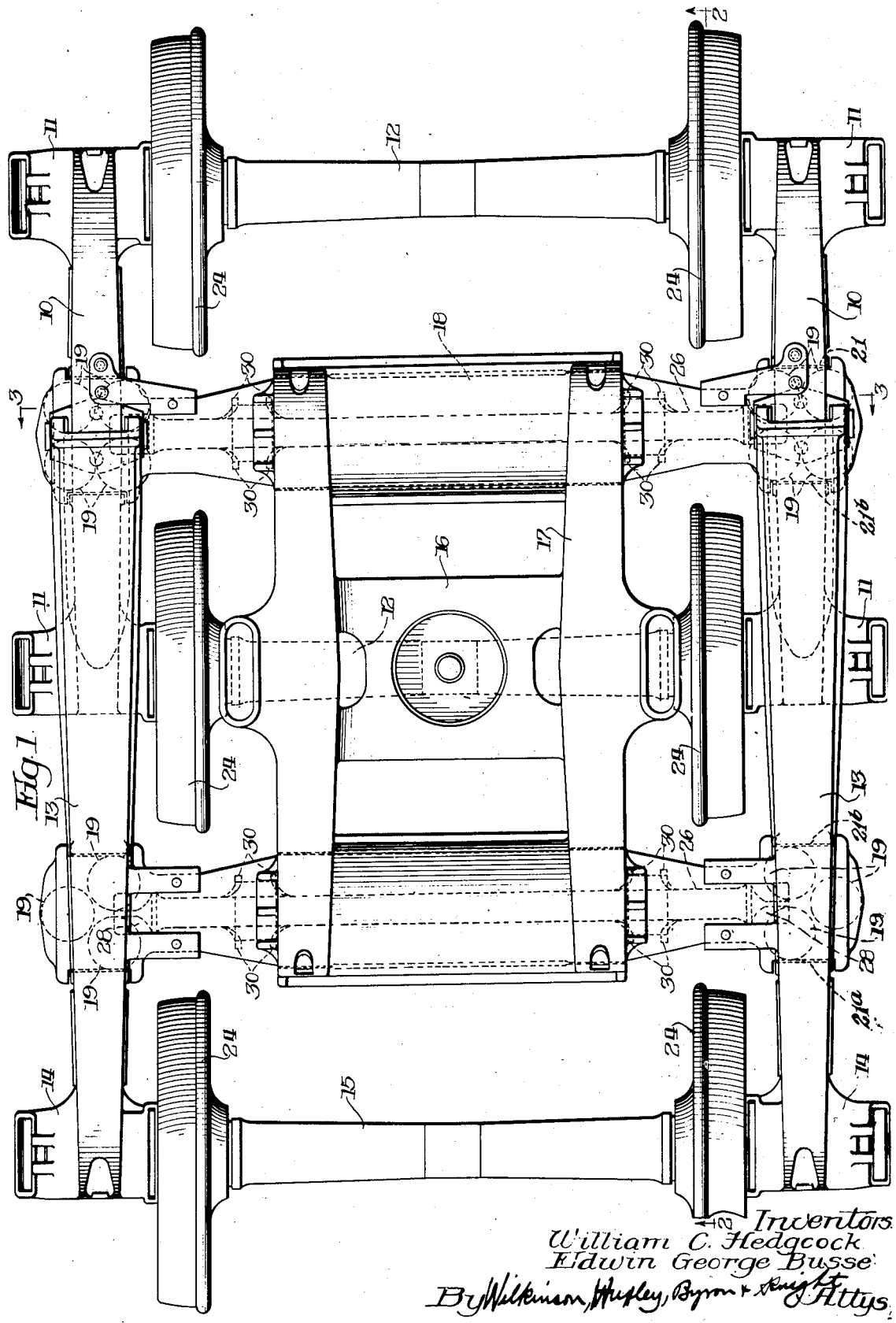

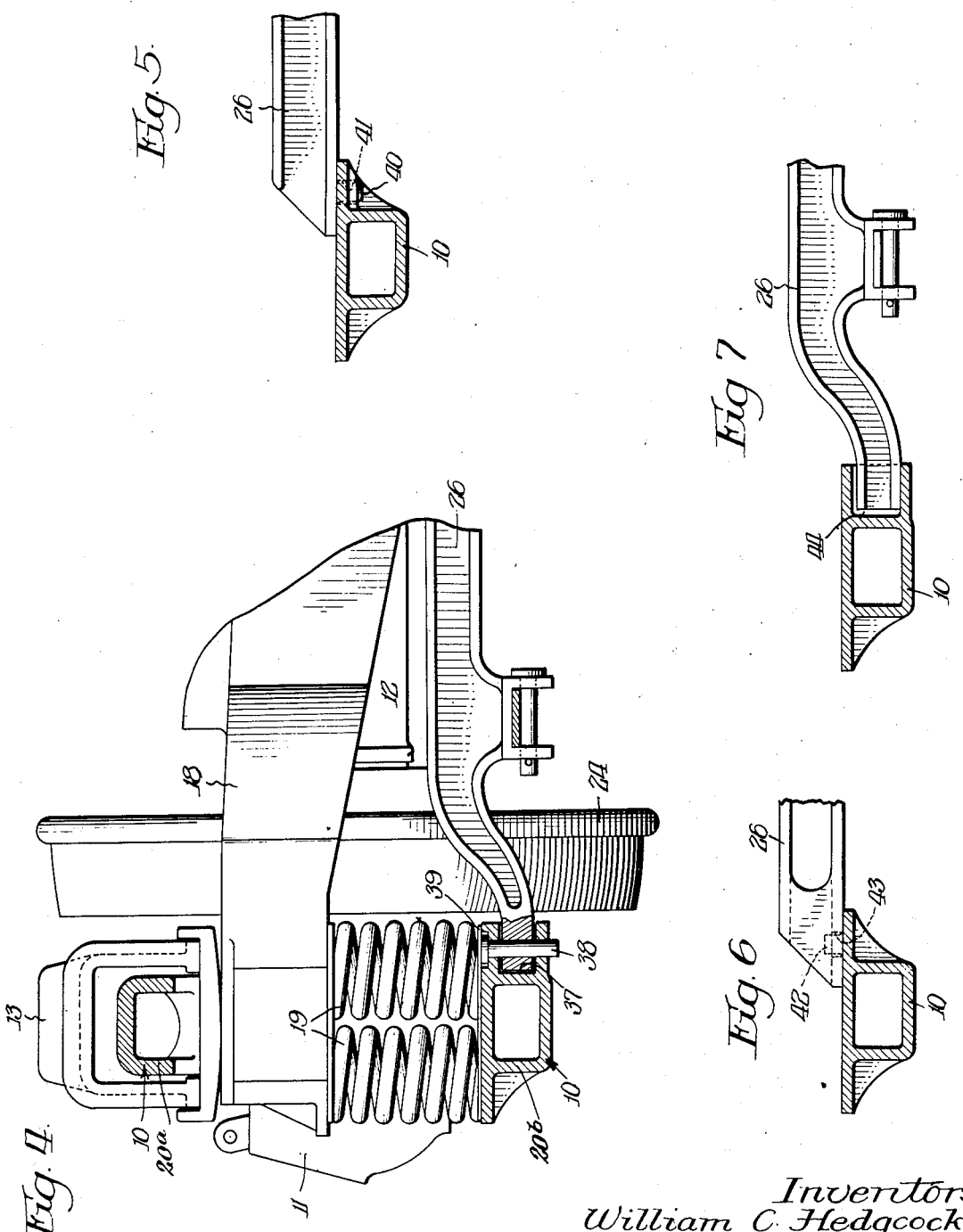

Aug. 7, 1934.  W. C. HEDGCOCK ET AL  1,969,130
TRUCK
Filed Dec. 15, 1928  4 Sheets-Sheet 4
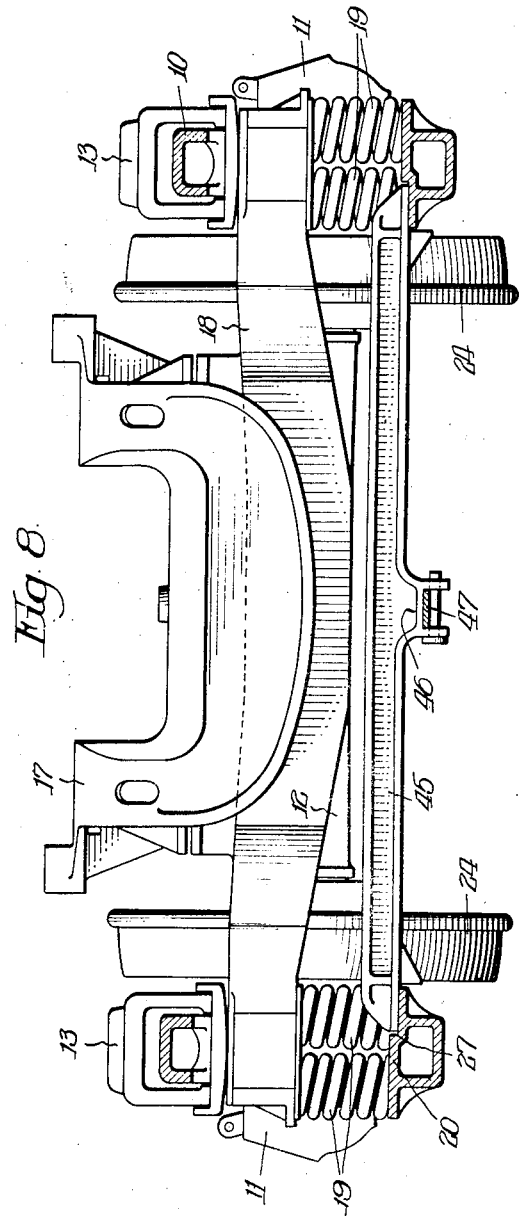
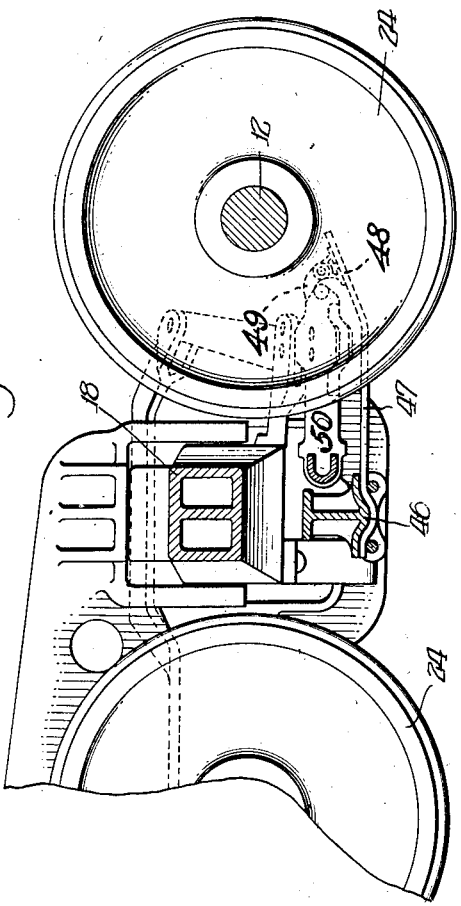
Inventors:
William C. Hedgcock.
Edwin George Busse.
By Wilkinson, Hurley, Byron & Knight
Attys.

Patented Aug. 7, 1934

1,969,130

UNITED STATES PATENT OFFICE 1,969,130

TRUCK

William C. Hedgcock and Edwin George Busse, Chicago, Ill., assignors to American Steel Foundries, Chicago, Ill., a corporation of New Jersey Application December 15, 1928, Serial No. 326,240

19 Claims. (Cl. 188—210)

This invention relates to railway car trucks, and more particularly to means for supporting and leveling brake beams carried by said car trucks.

One object of this invention is to provide a simple, durable, reliable and inexpensive means for supporting brake beam safety and leveling members.

Another object is to provide a cooperative association between side frames, bolster carrying springs and a bar for supporting brake beam safety and leveling means, which association is simple, economical and efficient.

Another object is to provide as an article of manufacture a simple and durable bar for supporting a brake beam safety and leveling member.

Another object is to provide a car truck in which the various elements cooperate in a new and improved manner and in a manner to meet all of the requirements under service conditions.

These and other objects are accomplished by means of the arrangement disclosed on the accompanying sheets of drawings, in which—

Figure 1 is a fragmentary top plan view of a railway car truck embodying our invention;

Figure 2 is a longitudinal sectional view of the same, taken in the plane of line 2—2 of Figure 1;

Figure 3 is a sectional end view of the same railway car truck, the same being taken substantially in the plane as indicated by the line 3—3 of Figure 1;

Figures 4, 5, 6, and 7 are detail views showing modifications of the means for connecting the brake mechanism supporting bar and the side frames;

Figure 8 is an end view of a truck corresponding to Figure 3 showing a modified form of supporting bar; and Figure 9 is a fragmentary side elevation of a truck showing the supporting bar of Figure 8, and showing application of its use to a third point support for brake mechanism.

The various novel features of the invention will be apparent from the following description and drawings and will be particularly pointed out in the appended claims.

Referring to the figures of the drawings, it will be noted that the invention is illustrated in connection with a six-wheel car truck having side frames which in this particular instance are of the articulated type, frame members 10 having journal boxes 11 in which two of the axles 12 are mounted, and side frame members 13 having journal boxes 14 in which another axle 15 is mounted. Side frame members 13 have overhanging portions engaging intermediate portions of the side frame members 10 whereby the load is properly distributed from the bolster 16 through longitudinally extending bolster members 17 and transverse bolster members 18, the latter of which are mounted upon coil springs 19 carried on spring seats 20 of the side frames, said spring seats forming the floors of the bolster openings in said side frames. These bolster openings or windows in the side frames are defined at the top and bottom by the compression and tension members 20a and 20b, of the side frames, respectively, as shown in Figures 3 and 4, and the column guides 21a and 21b, as shown in Figure 1 of the drawings, the spring seats 20, heretofore referred to, being provided on the tension members. It will be understood, of course, that the invention is not limited in its application to a six-wheel truck, for it may also be applied to any type of truck, as will be apparent.

Brake beams 21 carry heads 22 and shoes 23 which are adapted to engage the truck wheels 24 carried by the axles. These brake beams are supported near their ends by the usual hangers 25. In addition to supporting the brake beams in this manner, it is a well established fact that safety means should be provided for preventing the brake beams from falling to the ground in the event that they are torn from their normal hangings. Also, it is a well established fact that brake beams should be supported, maintained in a level condition, and guided during their operative movements to maintain the faces of the brake shoes parallel to the tread of the associated wheels at all times.

In this connection, among other things we have provided simple, reliable, efficient and inexpensive means for supporting such brake beam safety and leveling members, which means includes a bar 26. As shown in Figure 2, it is I-shaped in section. This bar 26 extends between and has its ends resting upon the side frames. More specifically, the spring supporting portions of the side frame are provided with depressions or pockets 27 for receiving the ends of the bar 26. The ends of the bar thus seated preferably are somewhat widened, as shown at 28 in Figure 1, not only to give proper supporting surface contact with the side frames but also to provide sufficient surface upon which the inner coil springs 19 may be seated. In order thus to accommodate the inner coil springs 19, the upper flange of the bar 26 at its ends must be cut away while the lower flange 29 of the bar at the ends thereof is seated in pockets 27 and thereby forms a continuous seat for the inner springs 19, parts of which springs are in engagement with the side frame spring seats 20.

The bars 26 on opposite sides of the transverse center thereof and at points just inside of the truck wheels 24 are provided with integrally formed downwardly extending brackets including projections 30 between which the brake beam safety and leveling bars 31 are mounted. Said brake beam safety and leveling bars or members are held in position by pins 32 extending between said projections 30 and which underlie said members 31. By referring particularly to Figure 2, it will be noted that the safety and leveling members or bars 31 underlie the brake beams and are engaged by portions thereof whereby the functions in question are performed.

The brackets for supporting the safety and leveling members 31 may be said to include four projections 30, each with a pin hole 33 therein, said projections extending downwardly and outwardly from the main portion of the bar 26. Each bracket is provided with a central enlarged or seat portion 34 about which the middle portion 35 of the associated leveling bar 31 is pressed. The supporting pins 32 lie just laterally of the curved portion 35 and support the safety member in a manner whereby the ends of the latter extend laterally and upwardly. The bar 26 adjacent its ends has at the lower sides thereof downwardly extending projections 36 which engage inner portions of the side frames to limit movement of said bar 26 transversely with respect to said side frames.

In Figures 4, 5, 6, and 7 modification of means for connecting the bar 26 to the side frames 10 is shown. In Figure 4 an apertured end of bar 26 is shown as inserted in a pocket 37 of the side frame 10, and a pin 38 provided for connecting the parts. A plate 39 upon which the springs 19 are mounted holds the pin 38 in locked position.

In Figure 5 the bar 26 is shown as having a projection 40 passing through an aperture 41 in the side frame 10.

In Figure 6 the side frame 10 is shown as having a projection 42 passing into an opening 43 in the bar 26.

In Figure 7 the bar 26 is shown as having one end slidably mounted in a pocket 44 in the side frame 10 without being pinned thereto. It is obvious that other connections between the side frame 10 and bar 26 could be made.

In Figures 8 and 9 there is shown a truck in which the supporting bar 45 has the bracket 46 at the middle thereof for supporting the brake beam safety and leveling bar 47 whereby a third point support is provided. A shoe 48 secured to ears 49 at the front end of the brake beam strut 50 rides on said safety and leveling bar 47 for performing the function of maintaining the faces of the brake shoes parallel to the tread of the associated truck wheels.

By means of the arrangements herein disclosed, the objects of this invention are accomplished.

It is our intention to cover all modifications of the invention falling within the spirit and scope of the following claims.

We claim:

1. In a railway car truck, the combination of oppositely arranged side frames having pockets therein, a bar extending therebetween and disposed in said pockets, a brake beam, brake beam safety and leveling means, and means whereby said safety and leveling means is secured to said bar.

2. In a railway car truck, the combination of oppositely arranged side frames having spring seats and pocket portions, a bar extending between said side frames and having its ends mounted in said pocket portions, a bolster supporting spring mounted on each end of said bar, brackets formed on said bar for supporting brake beam safety and leveling members, and depending stop members on said bar arranged adjacent said side frames for limiting movement in one direction of said bar with respect to said side frames.

3. In a truck, the combination of side frames each having spring seats thereon, spaced wheels supporting said side frames, brakes for said wheels, and brake cooperating means disposed between said side frames and forming a portion of said spring seats.

4. In a truck, the combination of side frames each having spring seats thereon, spaced wheels supporting said side frames, brakes for said wheels, brake cooperating means disposed between said side frames and forming a portion of said spring seats, and springs supporting a portion of said truck and disposed partially on said side frames and partially on said brake cooperating means.

5. In a truck, the combination of side frames each having spring seats thereon, spaced wheels supporting said side frames, brakes for said wheels, sockets formed in said side frames, brake cooperating means disposed in said sockets, securing means passing through each of said sockets and said brake cooperating means, and a guard member supported on each of said frames for retaining said securing means.

6. In a truck, the combination of side frames each having spring seats thereon, spaced wheels supporting said side frames, brakes for said wheels, sockets formed in said side frames, brake cooperating means disposed in said sockets, securing means passing through each of said sockets and said brake cooperating means, and a guard member supported on each of said frames for retaining said securing means, said guard member forming a portion of said spring seats.

7. A support for brake cooperating means including a bar adapted to extend between opposite side frames and having spaced integral bracket portions, said bracket portions each including spaced projections having a seat therebetween, said projections having securing means therein for said brake cooperating means.

8. A support for brake cooperating means including a bar adapted to extend between opposite side frames and having spaced integral bracket portions, said bracket portions each including spaced projections having a seat therebetween, said projections having securing means therein for said brake cooperating means, said bar having spacing means adjacent the ends thereof for engagement with an adjacent side frame.

9. A support for brake cooperating means including a bar adapted to extend between opposite side frames and having spaced integral bracket portions, said bracket portions each including spaced projections having a seat therebetween, said projections having securing means therein for said brake cooperating means, the ends of said bar being offset for engagement in a support.

10. A support for brake cooperating means including a bar having means for supporting brake cooperating means, said bar being substantially I-section having a web and upper and lower flanges, the upper flanges being discontinued adjacent the ends of said bar, the lower flanges forming portions of a spring seat.

11. In a truck, the combination of side frames each having spring seats thereon, spaced wheels supporting said side frames, brakes for said wheels, and brake cooperating means disposed between said side frames, said means being provided with a lower flange for support thereof on said side frames and forming a portion of said spring seats.

12. In a truck, the combination of side frames each having spring seats thereon, spaced wheels supporting said side frames, brakes for said wheels, brake cooperating means disposed between said side frames, said means being provided with a lower flange for support thereof on said side frames and forming a portion of said spring seats, and means associated with said lower flange adapted to engage with the side frames for limiting movement of said brake cooperating means with respect to said side frames.

13. In a truck, the combination of side frames each having spring seats thereon, spaced wheels supporting said side frames, brakes for said wheels, brake cooperating means disposed between said side frames, said means being provided with a lower flange for support thereof on said side frames and forming a portion of said spring seats, and means depending from said lower flange adapted to engage with the side frames for limiting movement of said brake cooperating means with respect to said side frames.

14. In a truck, the combination of side frames each having spring seats thereon, spaced wheels supporting said side frames, brakes for said wheels, a bar extending between said side frames and having means for supporting brake cooperating means, said bar being substantially I-section having a web and upper and lower flanges, said lower flange forming a support for said bar on said side frame and forming a portion of said spring seats, said upper flange being discontinued adjacent the ends thereof to provide clearance for springs mounted on said spring seats.

15. In a truck, the combination of side frames each having spring seats thereon, spaced wheels supporting said side frames, brakes for said wheels, a bar extending between said side frames and having means for supporting brake cooperating means, said bar being substantially I-section having a web and upper and lower flanges, said lower flange forming a support for said bar on said side frame and forming a portion of said spring seats, said upper flange being discontinued adjacent the ends thereof to provide clearance for springs mounted on said spring seats, and lugs depending from said lower flange adapted to engage with the side frames for limiting movement of said bar with respect to said side frames.

16. In a truck, the combination of side frames, each of said side frames including tension and compression members and column guides forming a window therewith, said tension member between said column guides providing a spring seat, spaced wheels supporting said side frames, brakes for said wheels, brake beams for said brakes, a bar extending between and supported by said tension members of said side frames between said column guides, and brake beam safety and leveling means carried by said bar.

17. In a truck, the combination of side frames, each of said side frames including tension and compression members and column guides forming a window therewith, said tension member between said column guides providing a spring seat, spaced wheels supporting said side frames, brakes for said wheels, brake beams for said brakes, a bar extending between and supported by said tension members of said side frames between said column guides, said bar having brackets disposed adjacent each of said side frames, and brake beam safety and leveling means supported by said brackets.

18. In a truck, the combination of side frames, each of said side frames including tension and compression members and column guides forming a window therewith, said tension member between said column guides providing a spring seat, spaced wheels supporting said side frames, brakes for said wheels, brake beams for said brakes, a bar extending between and supported by said tension members of said side frames between said column guides, and brake beam safety and leveling means carried by said bar adjacent each of said side frames and extending laterally of said bar.

19. In a truck, the combination of side frames, each of said side frames including tension and compression members and column guides forming a window therewith, said tension member between said column guides providing a spring seat, spaced wheels supporting said side frames, brakes for said wheels, brake beams for said brakes, a bar extending between and supported by said tension members of said side frames between said column guides, and brake beam safety and leveling means carried by said bar adjacent each of said side frames and extending laterally to each side of said bar.

WILLIAM C. HEDGCOCK.
EDWIN GEORGE BUSSE.